INVENTOR
NATHAN STEIN
By Emil J. Bednar
ATTORNEY

INVENTOR
NATHAN STEIN

By Emil J. Bednar

ATTORNEY

United States Patent Office 3,434,540
Patented Mar. 25, 1969

3,434,540
SAND CONTROL METHOD USING A PARTICULATE PACK WITH EXTERNAL AND INTERNAL PARTICLE SIZE DISTRIBUTION RELATIONSHIPS
Nathan Stein, Dallas, Tex., assignor to Mobil Oil Corporation, a corporation of New York
Filed Oct. 12, 1967, Ser. No. 674,800
Int. Cl. E21b 47/00, 43/04; B01d 23/10
U.S. Cl. 166—250                                              5 Claims

ABSTRACT OF THE DISCLOSURE

This specification discloses:

A method for controlling the movement of solid particles by fluid flowing from a subterranean formation into a wellbore. A particulate pack is placed in the wellbore to rest against the formation. The pack is formed of particles arranged with a particle size distribution so that:

(1) the particle size of the 15 weight percentile of the fines in the distribution of the pack's particles is less than four times the particle size of the 85 weight percentile of the fines in the distribution of the formation's particles, and (2) the pack's particles have a particle size distribution that, in all divisions thereof about any particle size into coarser and finer fractions, the particle size of the 15 weight percentile of the fines in the coarser fraction is less than four times the particle size of the 85 weight percentile of the fines in the finer fraction.

A separate pack may be provided for each strata comprising the formation. However, one pack may serve all strata forming the formation but with the pack's design being based upon the strata with the smaller particle size of the 85 weight percentile of the fines in the particle size distribution of such strata.

BACKGROUND OF THE INVENTION

Field of the invention

This invention is a method which relates to the production of fluid from a subterranean formation into a wellbore. More particularly, the method relates to the use of a particulate pack for controlling the undesired movement of solid particles from the formation with the produced fluid.

Description of the prior art

The production of fluid from a subterranean formation into a wellbore is a common practice. For example, the fluid may be crude oil, natural gas or water, and mixtures of these fluids. The formation may be sufficiently consolidated that the fluid can be produced into an open-completed wellbore. However, some formations have one or more unconsolidated strata which require various downhole "sand control" devices such as liners, gravel packs, sand screens, and the like to prevent an unacceptable production of solid particles from the formation into the wellbore with produced fluid. "Sand control" is a generic term identifying the prevention of movement of solid particles, usually sand grains, into a wellbore.

Some unconsolidated and poorly cemented formations have a structural matrix such that small-sized solid particles move with fluid flows in undisturbed regions of such formations. Additionally, many of these formations will cave, or even flow as fluids into the wellbore during fluid production unless structurally held in place by some device. Other of these formations have an internal structure wherein the movement of some of the solid particles weakens their matrix integrity to an extent that continued fluid production causes them to decompose or disintegrate into dispersed solid particles which move into the wellbore. In these formations, small-sized particles first are produced, then successively larger-sized particles until the entire formation, due to matrix disruption, is moved into the wellbore with the produced fluids.

The problems causde by these formations are sought to be solved with liners, gravel packs, sand screens, and the like. These "sand control" devices have not been found to be universally successful for all problem formations. The gravel pack has found some acceptance in "sand control" since it has provided useful results with many problem formations. The gravel pack is provided by surrounding a perforated liner with gravel, coarse sand, or other particulated material, which rests against the problem formation. The technique of placing the gravel pack in a wellbore is known as gravel packing.

In conventional gravel packs, the gravel in the pack is supposed to prevent the caving of the formation against the liner. It also is supposed to prevent solid particles (e.g. sand) from entering the wellbore with the produced fluid. The gravel pack also must not be plugged by accumulated solids during extended periods of fluid production into the wellbore.

The known techniques of gravel packing usually involve some study of the particle sizes of fluid-produced solid particles and samples of the formation itself. One technique involves the sieve-separation of the sample into several particle sizes and measurement of the amounts (by weight) of particles which pass through each sieve size. The several particle sizes are then correlated with the cumulative weight percentages of the particles which are larger than the particle size of a certain sieve size (or particle diameter). This correlation is readily obtained as a curve on a graph in which these cumulative weight percentages are plotted as the ordinate against the particle sizes as the abscissa. A logarithmic scale is usually used for abscissa plotting since both large and small particle sizes can be shown on the same graph. Semilogarithmic paper may be used to good advantage for such a graph. The curve on this graph visually displays the particle size distribution for the sample. For any particle size, the weight percent of the particle sizes greater than this certain particle size can be determined from the curve. This weight percentage may be expressed as the particle size of the weight percentile of the coarser particles in the distribution of the particles in the sample.

In an early gravel packing technique, the formation sample was first sieve-separated. Then, the results were plotted in graphic correlation as above described. The sizes of the gravel particles forming the gravel pack were specially proportioned to the sizes of the formation particles to be restrained in "sand control." For example, the gravel particles were made equal to the formation particle size of the 10 weight percentile of the coarser particles in the distribution of the particles in the formation sample. For practical gravel pack designs, it had been proposed to employ particles of a size from 8 to 13 times the 10 weight percentile of the coarser particles of the formation. Usually, this proportioning led to use of gravel particles in the Tyler Standard Screen Sizes of 4 to 10 mesh (0.185 to 0.065 inch) for "sand control" with most oil producing sands. However, no universal gravel pack can be obtained from this known proportioning criterion because of the great difference in matrix integrity, particle size distribution, and effects of fluid flow on the various problem formations. A change of one of these conditions relative to a formation causes the gravel pack to fail to function properly.

One facet of known gravel packs has been found to be universal. This facet is in the design of the liner which holds the gravel pack against the formation. Tests have shown that openings in the liner must be no greater than 2 times the diameter of the particle size to be excluded. If these openings are not larger than the particle size of the 10 weight percentile of the coarser particles of the gravel pack, gravel pack particles will bridge-over the openings and thereby are held against their production into the wellbore by fluid flows from the formation. However, this facet is true only if the gravel pack does not have internal movement of particles with fluid flows.

The gravel packing technique may "tailor" the particle size distribution of the gravel pack directly to the particle size distribution of the formation particles, or produced sand. Reference may be taken to U.S. Patent No. 2,905,245 for a complete description of such a technique. In this method, the formation's particle sizes, and their weight percentages, are measured and then graphically represented by a curve as hereinbefore mentioned. Then a pack is prepared of solid particles having a particle size distribution wherein: (1) the ratio of particle sizes in the pack between the 10 and 90 weight percentile values is at least 3 to 1; (2) the ratio of particle sizes in the pack and formation at their 90 weight percentile values is not greater than 12 to 1; and (3) the ratio of particle sizes in the pack and formation at their 50 weight percentile values is not greater than 8 to 1. Thus, if condition (1) is met, the pack could have a particle size distribution proportioned to the formation's particles which are to be held in place. In such case, if particles move within the formation, the particles within the pack must also move with fluid flows. At certain of the conditions (2) and (3), the pack must act as a total filter which collects all sizes of formation particles passing with fluid into the wellbore. This action results in "plugging" of the pack. Additionally, if the formation has particles which move in successively larger sizes due to matrix deterioration, then a pack proportioned directly over the entire particle size distribution of such a formation can be expected to have lost its particles into the wellbore with fluid flows.

Thus, the method of this patent may, in some fortunate circumstance, produce a workable gravel pack. However, in many situations the pack will not provide acceptable service in "sand control."

In working with gravel packing techniques, and in analysis of particle size distributions of "sand control" problem formations, several essential criteria have been found which relate a gravel or other particulate pack to a formation with which the pack is to be used. First, the pack must be formed of particulated solids which have a particle size distribution such that fluid flows from the formation will not remove any significant particle sizes from the pack. Second, the pack must have a particle size distribution such that it allows the particles to pass therethrough which are free to move internally within a formation in response to fluid flows. Third, the pack must have a particle size distribution to exclude all other particle sizes which could be made mobile by deterioration of the formation at unsupported surfaces, or by decay of the formation matrix. The method of the present invention provides particulate packs which meet the above listed criteria.

SUMMARY OF THE INVENTION

In accordance with this invention, there is provided a method for controlling the movement of solid particles from a subterranean formation in response to fluid flowing from the formation into a wellbore provided therein. A particulate pack is placed in the wellbore to rest against the formation so that fluid flowing from the formation passes through the pack. The particle size distribution of particles forming the pack is arranged so that: (1) the particle size of the 15 weight percentile of the fines in the distribution of the pack particles is less than four times the particle size of the 85 weight percentile of the fines in the distribution of formation particles; and (2) the pack particles have a particle size distribution that in all divisions of the pack about any particle size, the particle size of the 15 weight percentile of the fines in the coarser fraction is less than four times the particle size of the 85 weight percentile of the fines in the finer fraction.

DESCRIPTION OF SPECIFIC EMBODIMENTS

Figure 1:
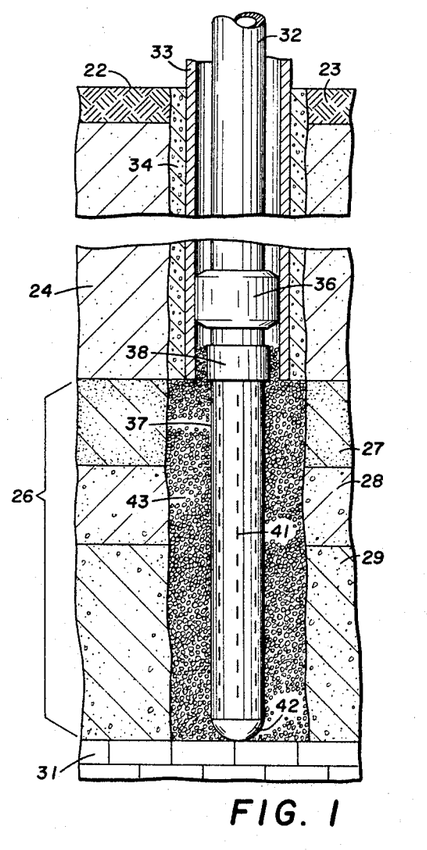
FIGURE 1 is a schematic representation, in vertical section, of a particulate pack within a liner-equipped wellbore penetrating a formation with the pack arranged for controlling the movement of solid particles by employing the method of this invention.

The present method will be described relative to the structures shown in FIGURE 1. A wellbore 21 extends from the earth's surface 22 through an overburden 23 and caprock 24 to penetrate a formation 26 from which fluid flows into the wellbore 21.

The formation 26 may be of any geological origin, and contain any fluid which flows into the wellbore 21. For example, the formation 26 is comprised of strata 27, 28, and 29 which may be poorly consolidated sandstones. The fluid flowing from the formation 26 may be water. The formation 26 rests upon bedrock 31. For purposes of this description, caprock 24 and bedrock 31 will be considered to be barren of connate fluid and also impervious to fluid flowing therein from the formation 26.

A pipe string 32 extends from the earth's surface 22 into the wellbore 21. The pipe string 32 is protected in its traverse of the overburden 23 and caprock 24 by a casing 33 surrounded by cement sheath 34. A packer 36 seals the lower portion of wellbore 21 to fluid flowing in the annulus between the pipe string 32 and the casing 33.

A slotted liner 37 is secured to the lower end of the pipe string 32 by a collar 38. The liner 37 has a plurality of openings, such as slots 41, by which fluid can flow from the wellbore 21 into the pipe string 32. The liner 37 is closed at its lower end with a shoe 42.

The liner 37 may be of conventional construction which serves to hold a particulate pack 43 in the wellbore 21 so as to rest against the exposed face of the formation 26. The slots 41 may be dimensioned according to conventional practices to prevent particles of the pack 43 from entering the pipe string 32 when fluids flow from the formation 26 into the wellbore 21.

The placement of the pack 43 into the wellbore 21 may be by any technique. For example, the pack 43 can be placed into position to rest against the formation 26 by conventional Fracpac or reverse circulation techniques. However, the particle sizes of the pack 43 are arranged by employing the present method.

Figure 2:
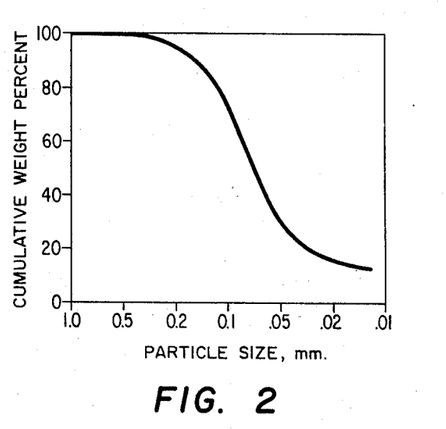
FIGURES 2, 3, and 4 are graphs illustrating particle size distributions for the several strata which comprise the formation shown in FIGURE 1.
Figure 3:
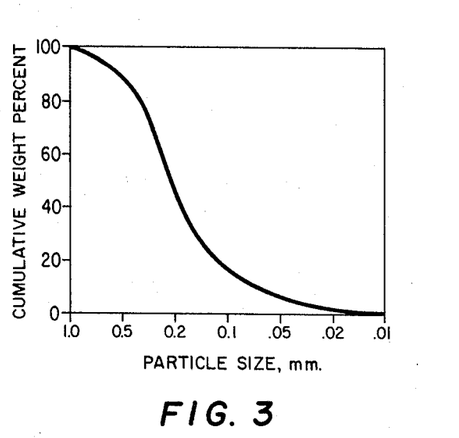
Figure 4:
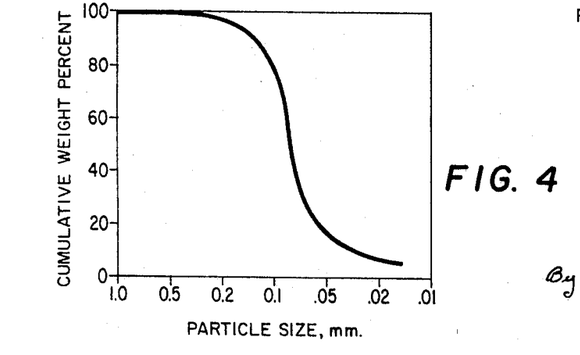

As earlier stated, not all unconsolidated strata suffer from problems of solid particles being produced when fluids flow from them into a wellbore. More particularly, a study of the strata 27, 28, and 29 may show that not all of them will create "sand control" problems by particle movements in response to fluid flows. For example, the strata 27, 28, and 29 may be unconsolidated sandstones in which the strata 27 and 29 cause sand production problems, while strata 28 does not cause such a problem in the environment shown in FIGURE 1. Samples of these strata, in field operations, were taken and sieve-separated. Graphic representations for the respective samples of each strata of the cumulative weight percentages were plotted against particle sizes in millimeters (mm.) on semi-log coordinate graph paper. The curves illustrating particle size distributions produced by this graphic presentation are shown in FIGURES 2, 3, and 4 for the strata 27, 28, and 29, respectively. The strata 27 and 29 cause sand production problems by fine particle movements; the strata 28 does not. Since all the curves in these figures are similar, no simple test is available to detremine merely from the FIGURES 2, 3, and 4 which strata will cause sand production problems.

A gravel pack designed for only the strata 28 may be ineffective for controlling sand production from the strata 27 and 29. Also, a gravel pack, directly patterned on the particle size distributions of the strata 27 and 29, almost certainely will lose its own particles into the pipe string 32 for reasons earlier mentioned.

The method of this invention, as mentioned, provides a particulate pack which has certain numerical relationships of particle size distributions both internally of the pack and also externally to the particles of which the problem formation is comprised. These certain numerical relationships may be more easily understood if a brief description of related practices is first considered before entering into a detailed description of specific embodiments of the present method.

The present method bears a closer resemblance to practices in earthen dam construction rather than known techniques of forming gravel packs with wellbores for "sand control." In civil engineering, it has been well known for several decades that a soil mass, which forms the earthen dam, can be protected from erosion from impounded water by covering it downstream with a layer of coarser sand known as a "filter." If the filter is properly designed, particles in the soil mass cannot move through the pores of the filter. Therefore, percolating water cannot cause seepage that scours and erodes the soil mass of the dam.

The functioning of the soil mass and filter is termed "filtering." Also, the filter is arranged to be "self-filtering" whereby no particles move therein in response to fluid flow. The particle size distribution in the filter to obtain these functions is believed to have been determined empirically about twenty years ago.

Figures 5, 6, 7:
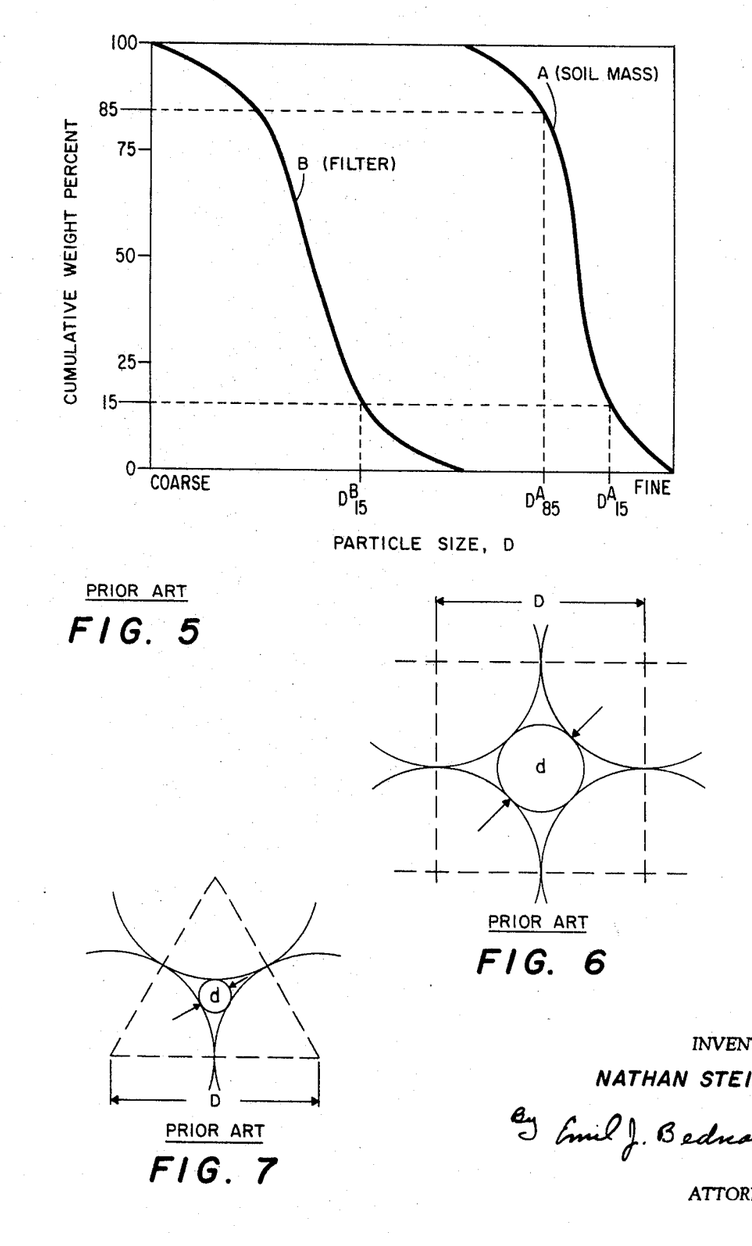
FIGURE 5 is a graph illustrating prior art techniques employed in creating soil masses to protect earthen dams from erosion.
FIGURES 6 and 7 are illustrations of the regular packing relationships of spheres of uniform diameter.

The design, by this known technique, of a "self-filtering" filter for a soil mass will be described relative to FIGURE 5. The soil mass is a dam which is to be protected by the filter. A sample of the soil mass is sieve-separated. The correlation between particle sizes and their cumulative weight percentages is graphically presented as Curve A. Similarly represented, the filter produces Curve B illustrating its particle size distribution. It was found that the filter (represented as Curve B) will contain the particles of the soil mass (represented by Curve A) and without internal movement of the filter's particles if the following relationship exists:

$$4D^A_{85} > D^B_{15} > 4D^A_{15}$$

wherein $D^A_{85}$ is the particle size of the 85 weight percentile of the fines in the distribution of particles in the soil mass;

$D^B_{15}$ is the particle size of the 15 weight percentile of the fines in the distribution of the filter's particles; and $D^A_{15}$ is the particle size of the 15 weight percentile of the fines in the distribution of particles in the soil mass.

If $D^B_{15} > 4D^A_{85}$, the filter's particles are too coarse so that particles of the soil mass will move through the pores of the filter. If $D^B_{15} < 4D^A_{15}$, the pressure drop across the filter is too high so that the smaller particles of the filter are displaced by any fluid flowing therethrough. Thus, according to the described arrangement of the filter, the soil mass is held in place in its entirety. No particle can move internally of the filter. Also, the filter is so arranged in particle size distribution that the pressure drop across the filter will be the smallest possible and yet effectively protect the soil mass. It can be seen that the filter serves as an absolute plug or barrier to prevent movement of particles from the soil mass in response to a flowing fluid.

This method for producing a "self-filtering" filter to restrain a soil mass in earthen dams is based upon an empirical relationship justified by experience. The relationship is theoretically justified by considering the pore of a diameter $\underline{d}$ in a regular packing of spheres of a uniform diameter D. In FIGURE 6, the most open (cubical) packing is shown as: $D/d = 1 + \sqrt{2}$. In FIGURE 7, the tightest (rhombohedral) packing is shown as $D/d = 1 + 2\sqrt{3}$.

If the various packing of spheres' arrangements are analyzed, the average packing is shown to be $(D/d) \cong 3.43$. If a particle size of $\bar{d}$ is to move through the pore with a diameter $\underline{d}$, then $\bar{d}$ must be a little less than $\underline{d}$. Therefore, the average packing $(D/d)$ must be a little larger than 3.43. Usually, the average packing $(D/d)$ is designated as $f = D/\bar{d}$ and for practical uses it is considered as $f = 4.0$. It will be apparent that no simple considerations can provide a truly definitive numerical value of the factor $f$.

The origin of the 15 and 85 weight percentile factors in correlation to particle size distributions resides in the standard deviation G for a normal distribution. More particularly the following relationship has been derived:

$$G = D_{84.13\%} - D_{50\%} = D_{50\%} - D_{15.87\%}$$

Approximately 68% of the total particle weight falls between the limits $D_{15.87\%}$ and $D_{84.13\%}$. Generally, these limits are considered in practice to be $D_{15\%}$ and $D_{85\%}$. Thus these limits include that portion of the particle size distribution representing more than half the total sample. The distribution of particles is generally based upon weight percentiles and not diameter percentile. Therefore, there is no real advantage in using the more concise values. Historically, it is likely that the 15 and 85 weight percentile factors were selected rather arbitrarily upon a choice influenced by familiarity with normal statistical analysis. For purposes of defining the method of the present invention, the 15 and 85 weight percentile factors will be used with the average packing of particles, $f = 4.0$. The significance of these definitions will be more apparent from the following detailed description of the present method's embodiments.

A preferred embodiment of the present method will be described in reference to FIGURES 1 to 4. For convenience, assume that the formation 26 is now composed solely of strata 27. A sample of the formation 26 is obtained by any suitable procedure. For example, a sidewall coring device may be used for this purpose. The sample is cleaned in oil solvents, and then disaggregation of the particles is accomplished in water containing a dispersant. The particle sizes and their cumulative weight percentages are determined from results obtained by sieve-separation of the sample. If the particles are extremely small in size, they may be analyzed by water-sedimentation rate analysis.

With this data, the particle sizes of the sample are correlated with their cumulative weight percentages for determining the samples' particle size distribution, which is represented by the curve shown in FIGURE 2. Then, the particle size of the 85 weight percentile of the fines in the distribution of the formation's particles is determined by correlation from the curve. In this example, the particle according to this definition would have a size (diameter) of about 0.125 mm.

In many instances, the particle size distribution and the desired correlation of the particle size and cumulative weight percent will be known. Thus, the particle size of the 85 weight percentile of the fines in the distribution will be available without performing the described analysis, determination, and correlation steps. Obviously, under these conditions, the analysis, determination, and correlation steps need not be performed.

As another step of this method, particles are provided to form the particulate pack 43. More particularly, particles are selected from available gravels, or other sources of particulate materials, so that the pack 43 will have a particle size distribution wherein the particle size of the 15 weight percentile of the fines in the distribution of the particles in the pack is less than four times the particle size of the 85 weight percentile of the fines in the distribution of the formation's particles. In the present example, the pack 43 must have a particle size of the 15 weight percentile of the fines in its distribution less than 0.50 mm., which is four times the 0.125 mm. value previously obtained from the curve of FIGURE 2. Preferably, this particle size of the pack 43 should be as close to the 0.50 mm. limit as possible to retain the greatest permeability to fluid flows in the pack 43. In many instances, this particle size criterion will be determined solely by the sizes of gravel, or other particulate materials, that are available for use. For example, gravel, or other particulate matter, is usually available in a variety of size ranges. Thus, the gravel, or mixture of gravel, is selected to have the largest 15 weight percentile particle size criterion but yet below the 0.50 mm. value.

Usually, the available gravels are treated in the same manner as is the sample of the formation 26. Then, from curves similar to those in FIGURE 2, correlation of the particle size of the 15 weight percentile of the fines in the distribution of the gravels' particles is readily determined. Once this characteristic of the gravels is known, then a gravel, or mixtures of gravels, is readily selected from those available for use in the present method.

A pack 43 formed of particulate material with this particle size characteristic will control the movement of particles from the formation 26 in response to fluid flows into the wellbore 21. More particularly, a pack 43 of such design will permit the solid particles which move internally of the undistributed formation 26 to pass through the pack 43 into the pipe string 32. As a result, the pack 43 is not plugged by collection of these small-sized particles on its upstream face. These particles are of such small sizes that no significant "sand control" problems are created by their movement into the wellbore 21. However, all other sizes of solid particles which result from deterioration of the matrix of the formation 26 are entrapped in the pack 43.

In addition, the particles which form the particulate pack 43 are selected so that their particle size distribution has an additional certain characteristic. This characteristic requires that in all divisions of the pack 43 into coarser and finer fractions about any particle size, the particle size of the 15 weight percentile of the fines in the coarser fraction is less than four times the particle size of the 85 weight percentile of the fines in the finer fraction. The pack 43 with this characteristic of its particle size distribution is "self-filtering." By "self-filtering" is meant that the particle sizes are so related that the larger-sized particles hold the smaller-sized particles against movement by fluid flows through the pack 43 into the pipe string 32.

In many cases, from prior experience or otherwise, this characteristic of the particles forming pack 43 will be known. Thus, the pack 43 is readily selected from available materials of known characteristics. However, the pack 43 may be formed experimentally by mixing several available gravels until the resultant mixture provides the desired characteristics with respect to the particle size distributions within the pack.

Various techniques may be employed to evaluate available gravels to determine whether they have this desired characteristic, or if it can be obtained by mixing several of the available gravels.

One technique for particle size distribution analysis can be used to determine whether the pack 43 will have this certain characteristic from the particulate material which forms it. This method of analysis will be described in reference to FIGURE 9. A sample of the particulate material, usually formed of a mixture of various sizes and amounts of particles, is sieve-separated. The results of this separation are correlated graphically by plotting particle sizes against their cumulative weight percentages which produces a curve labeled "Original Distribution S." Then, from some arbitrary diameter $D_o$, the sample is divided into two components; a finer fraction which contains all particles of a diameter less than, or equal to $D_o$, and a coarser fraction which contains all particles of a diameter D greater than $D_o$. The finer and coarser fractions are then sieve-separated so that the correlation between the particle sizes and their cumulative weight percentages is determined. These results of the correlation are graphically represented by the curves labeled "Coarser Fraction $S_c$ and Finer Fraction $S_f$." Then, the ordinate of the point where the curve "Coarser Fraction $S_c$" intersects the 15% cumulative weight percent abscissa represents $D'$ which is the particle size of the 15 weight percentile of the fines in the coarser fraction. Also, the ordinate of the point where the curve "Finer Fraction $S_f$" intersects the 85 cumulative weight percent abscissa represents $D_2$ which is the particle size of the 85 weight percentile of the fines in the finer fraction. This analysis procedure is repeated for several particle size values of $D_o$ until the particle size distribution is determined to satisfy the requirement that in all divisions of the pack into coarser and finer fractions about any particle size, the particle size of the 15 weight percentile of the fines in the coarser fraction is less than four times the particle size of the 85 weight percentile of the fines in the finer fraction.

Figure 9:
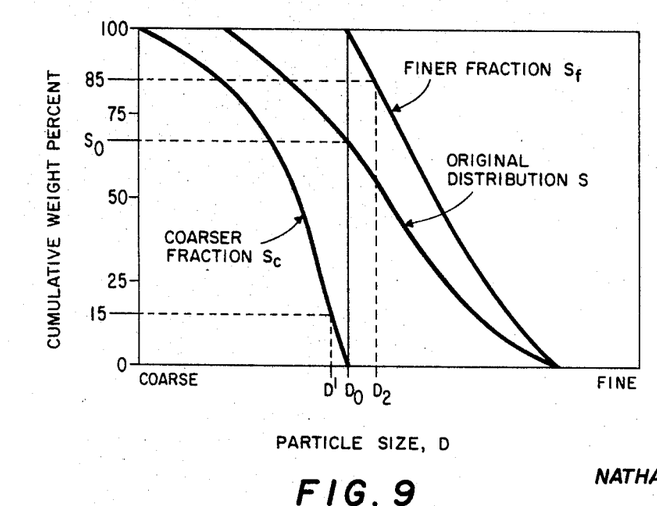
FIGURE 9 is a graph illustrating the division of particulate matter into coarser and finer fractions about any particle size $D_0$.

The above analysis may be performed mathmetically without the actual division of the sample into finer and coarser fractions about any particle size $D_o$. These calculations may be performed either manually, or more desirably by a computer. Let $S_o$ represent the value which is the cumulative weight percentile corresponding to the particle size $D_o$ in the "Original Distribution S" of the sample. Then, the finer fraction $S_f$ is defined as follows:

$$S_f = S/S_o \text{ or } S = S_f \cdot S_o$$

Similarly, the coarser fraction $S_c$ is defined as follows:

$$S = S_c(1 - S_o) + S_o$$

Then, if $S_f = 85$ cumulative weight percentile in the Finer Fraction $S_f$, it is seen that this relationship corresponds to $S = .85S_o$. Also, if $S = 15$ cumulative weight percentile of $S_o$, then it is seen that this relationship corresponds to $S = .15(1 - S_o) + S_o = .85S_o + .15$ in which the cumulative weight percentiles are expressed as decimals. The necessary calculation procedure is summarized as follows:

(1) For each value of $D_o$, find the corresponding value of $S_o$.

(2) Evaluate $S_2 = .85S_o$ and find the $D_2$ corresponding to $S_2$.

(3) Evaluate $S^1 = .85S_o + .15$ and find the $D'$ corresponding to $S^1$.

(4) If for all values of $D_o$, the value of $D'$ (the particle size of the 15 weight percentile of the fines in the coarser fraction) is less than four times $D_2$ (the particle size of the 85 weight percentile of the fines in the finer fraction), then the sample is "self-filtering" since it has a particle size distribution such that all of its particles are retained in position during flow of fluids therethrough.

Other methods of performing the above analysis, either actually or mathematically, will be apparent to those skilled in the art. Any method to effect the desired analysis may be used in practicing the method of this invention.

Where the formation 26 is formed of strata 27, 28, and 29, another embodiment of the present method may be employed. The particle size distributions are obtained for the strata 28 and 29 in the same manner as for strata 27. Then by the same steps as practiced in the embodiment relative to the strata 27, a particulate pack is provided each strata which has the proper characteristics of particle sizes to such strata, and also, within the pack itself. Thus, a pack "tailored" to each strata is positioned adjacent such strata. Thus, there is no problem with the pack 43 serving only one strata and being ineffective as to one or more other strata. This arrangement is well suited for use in formations where the strata are of considerable thickness. Naturally, each pack is placed within the wellbore 21 in upward succession so as to reside adjacent and rest against the strata for which it is designed.

Where the formation 26 is formed of strata 27, 28, and 29 of small thickness, another embodiment of the present method may be used to advantage. As in the other embodiments, the particle size distributions are obtained for each of the strata. The correlation of the particle size, in each strata, of the 85 weight percentile of the fines in the distribution of the strata's particles is obtained. Then the smallest of these particle sizes is selected for designing the pack 43. The pack is then arranged to this particle size characteristic and with the other characteristic of internal particle size relationships as was the particulate pack of the first described embodiment. The pack is then placed into position in the wellbore 21. Since this pack is correlated to the most troublesome strata relative to sand production problems, the same pack will function effectively with all of the other strata.

Mathematical derivations have shown that a remote possibility exists in producing a pack 43 according to the present method in which such small particle sizes are used that the fluid flow therethrough is unduly restricted. Such a pack arrangement does not appear possible from the normally available particulate materials. Special small sized particulate materials would have to be prepared and carefully mixed to produce this type of pack. In the event that a pack of such character would be formed and found undesirable, then a new pack should be created of either larger sized particles or by different mixtures of the available materials. For practical purposes, the creation of a pack having undesirably restricted fluid permeabilities is just a mathematical possibility and never should be encountered in field operations.

The following example provides detailed information of how the present method was used to overcome a "sand control" problem in a water injection well.

EXAMPLE

A "sand control" problem was experienced with a waste fluid disposal well which was used for disposing waste aqueous liquids by their injection into a sand formation residing 5,639 feet below the earth's surface. When fluid injection was interrupted, reverse circulation of fluid from the formation into the well carried with it unacceptable amounts of the formation solids, i.e., sand.

A sample of the sand formation was obtained. It was cleaned, dried, and sieve-separated. The particle sizes were plotted against their cumulative weight percentages and the results are represented by the curve shown in FIGURE 8. The sand formation had properties such that a small percentage of the smaller particle sizes would move with fluid flow in the undisturbed formation in the environment shown in FIGURE 1. As the small particles were moved by reverse flow of fluid into the disposal well, the structural integrity of the formation matrix was upset and larger particle sizes became free to move. Then, by progressive degeneration of the formation matrix, sloughing of the face of the formation would occur. Thus, some means was required to prevent undesired movement of the particles of the formation which caused the severe "sanding" problem in the well during backflowing conditions.

Figure 8:
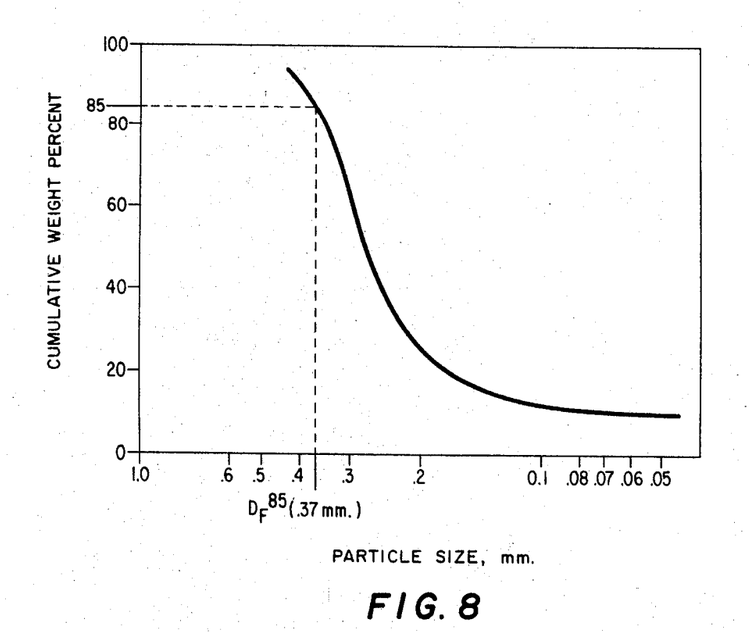
FIGURE 8 is a graph illustrating the particle size distribution of a formation in which the present method was used to produce a particulate pack that prevented undesired solid particle movements with fluid flowing into a wellbore.

From FIGURE 8, the particle size of the 85 weight percentile of the fines in the distribution of formation particles was determined from the curve. This particle size was found to be 0.365 mm., or 0.37 mm. Thus, a pack to retain the formation's particles must have a particle size of the 15 weight percentile of the fines in the distribution of particles less than four times the 0.37 mm. particle size of the formation, or 1.48 mm., in accordance with this invention.

Additionally, the particle sizes of gravel-pack materials which formed the pack were selected so that in all divisions of the pack into coarser and finer fractions about any particle size, the particle size of the 15 weight percentile of the fines in the coarser fraction was less than four times the particle size of the 85 weight percentile of the fines in the finer fraction.

More particularly, several gravel-pack materials were available which appeared to provide particle size distributions near to desired criterion of characteristics for the pack. These materials were sieve-separated and had the following properties:

|  | Grain Size Range (mm.) | $D_{15}$ (mm.) |
| --- | --- | --- |
| Material: |  |  |
| A | 0.28–1.1 | 0.44 |
| B | 0.95–2.9 | 1.49 |
| C | 1.9–3.4 | 2.30 | wherein $D_{15}$ is the particle size of the 15 weight percentile of the fines in the distribution of the particles of the materials.

From the above tabulation, a mixture of the materials appeared to meet the characteristic of the defined relationship to the formation particle size distribution. However, it was not certain that in any division of the admixed materials about any particle size, the particle size of the 15 weight percentile of the fines in the coarser fraction was less than four times the particle size of the 85 weight percentile of the fines in the finer fraction.

The particle size distributions and application of the above characteristics showed that a blend of materials A, B, and C could produce a satisfactory particulate pack. The following admixture was prepared:

|  | Parts by Weight | Grain Size Range (mm.) |
| --- | --- | --- |
| Material: |  |  |
| A | 1 | 0.28–1.1 |
| B | 1 | 0.95–2.9 |
| C | 4 | 1.9–3.4 |

The admixture provided the following correlation between particle sizes D (mm.) and cumulative weight percents S:

| D (mm.) | .30 | .50 | .70 | .90 | 1.10 | 1.40 | 1.7 |
| --- | --- | --- | --- | --- | --- | --- | --- |
| S | .1 | 5.2 | 14.2 | 16.1 | 16.9 | 18.4 | 24.8 |
| D (mm.) | 2.1 | 2.5 | 2.7 | 3.0 | 3.2 | 3.4 |  |
| S | 34.8 | 68.1 | 87.0 | 95.7 | 98.3 | 100.0 |  |

Figure 10:
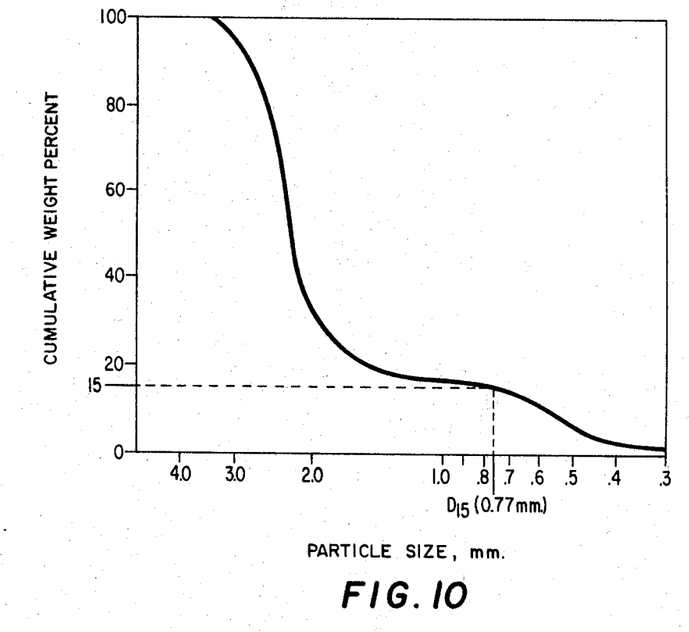
FIGURE 10 is a graph illustrating the particle size distribution of the particulate pack provided by the present method for the formation represented in FIGURE 8.

Then, the above data was graphed to produce the curve shown in FIGURE 10. This admixture, from the curve, had an acceptable $D_{15}$ value of 0.77 mm.

The data, represented by the curve of FIGURE 10, was used also to calculate (1) the particle sizes of the 15 weight percentile of the fines in a coarse fraction (represented as $D_C{}^{15}$); and (2) four times the particle size of the 85 weight percent of the fines in a finer fraction (represented as $4D_F{}^{85}$) about a plurality of divisions of the admixture about several arbitrary particle sizes $D_o$. This calculation was carried out on a computer which is mathematically equivalent to the method earlier described relative to FIGURE 9. The determined values of $D_o$, $D_C^{15}$, and $4D_F^{85}$ are tabulated as follows:

| $D_o$ (mm.) | $D_C^{15}$ (mm.) | $4D_F^{85}$ (mm.) |
|---|---|---|
| .3 | .77 | 1.18 |
| .4 | .93 | 1.54 |
| .5 | 1.51 | 1.94 |
| .8 | 1.83 | 2.67 |
| 1.0 | 1.89 | 2.82 |
| 1.3 | 1.93 | 3.08 |
| 1.7 | 2.14 | 6.41 |
| 2.0 | 2.28 | 7.11 |
| 2.40 | 2.45 | 9.27 |
| 2.8 | 2.85 | 10.38 |
| 3.2 | 3.23 | 10.64 |
| 3.4 | 3.4 | 10.71 |

Figure 11:
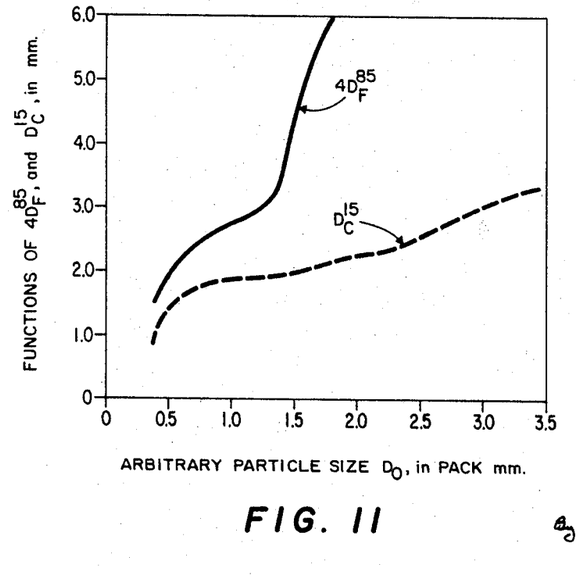
FIGURE 11 is a graph illustrating the relationship between certain particle sizes and their weight percentiles of the particulate pack represented in FIGURE 10.

For convenience, these data are graphically displayed in FIGURE 11. It will be noted that the particles of the admixture have a particle size distribution such that for all division of the admixture about any arbitrary particle size $D_o$, the particle size of the 15 weight percentile of the fines in the coarser fraction ($D_C^{15}$) is less than four times the particle size of the 85 weight percentile of the fines in the finer fraction ($4D_F^{85}$).

The admixture was prepared in a sufficient quantity to be used in the disposal well. It was placed within the well to rest agaisnt the formation by the conventional Fracpac technique. The pack had a radial thickness of about 4 inches and extended in the well about 20 feet vertically above the formation. A liner held the pack in position and had openings about 1 m. in diameter to contain the pack. These openings were equal to about 2 times the 10 weight percentile particle diameter of the coarser particles in the pack.

The pack has been without any determinable defects in design or operation during about 7 months' service. No. undesired sand production during backflow of formation fluid has occurred when the well was shut down. Obviously, the admixture has provided a particulate pack for the sand formation which permits the small particles moving within the undisturbed formation to pass through the pack with fluid flowing into the well. As a result, these small particles cannot "plug" the pack. Also, the particle size distribution of the pack is such that no particle within the pack can be moved by the flow of fluid therethrough. Thus, the pack keeps the formation matrix from deterioration through uncontrolled sand production.

From the foregoing description, and examples of specific embodiments of this invention, it will be apparent that a novel method has been described that is useful to control the movement of particles by fluids flowing from a formation into a wellbore. Various changes and modifications may be made to the steps of this method without departing from the spirit of the invention. It is intended that such changes and modifications fall within the scope of the appended claims.

What is claimed is:

1. A method for controlling the movement of solid particles from a subterranean formation in response to fluid flowing from the formation into a wellbore formed therein by placement of a particulate pack in the wellbore to rest against the formation so that fluid flowing from the formation passes through the pack, the improvement comprising:
    (a) arranging the particle size distribution of particles forming said pack such that:
        (1) the particle size of the 15 weight percentile of the fines in the distribution of said particles in said pack is less than four times the particle size of the 85 weight percentile of the fines in the distribution of the particles comprising the said formation, and
        (2) said particles in said pack have a particle size distribution such that in all divisions of said pack into coarser and finer fractions about any particle size, the particle size of the 15 weight percentile of the fines in the coarser fraction is less than four times the particle size of the 85 weight percentile of the fines in the finer fraction.

2. A method for controlling the movement of solid particles from a subterranean formation in response to fluid flowing from the formation into a wellbore formed therein, comprising the steps of:
    (a) positioning a particulate pack in the wellbore to rest against the formation so that fluid flowing from said formation passes through said pack, said pack arranged of particles to have a particle size distribution such that:
        (1) the particle size of the 15 weight percentile of the fines in the distribution of said particles in said pack is less than four times the particle size of the 85 weight percentile of the fines in the distribution of the particles comprising said formation, and
        (2) said particles in said pack have a particle size distribution such that in all divisions of said pack into coarser and finer fractions about any particle size, the particle size of the 15 weight percentile of the fines in the coarser fraction is less than four times the particle size of the 85 weight percentile of the fines in the finer fraction.

3. A method for controlling the movement of solid particles from a subterranean formation in response to fluid flowing from the formation into a wellbore therein comprising the steps of:
    (a) determining the particle size distribution of the particles of which the formation is comprised,
    (b) correlating the particle sizes of said formation particles with the weight percentiles thereof for establishing the particle size of the 85 weight percentile of the fines in the distribution of said particles,
    (c) providing particles to form a particulate pack and said particles having a particle size distribution wherein the particle size of the 15 weight percentile of the fines in the distribution of said particles is less than four times the particle size of the 85 weight percentile of the fines in the distribution of said particles comprising said formation,
    (d) selecting said particles which form said particulate pack so that the particle size distribution thereof provides in all divisions of said pack into coarser and finer fractions about any particle size that the particle size of the 15 weight percentile of the fines in the coarser fraction is less than four times the particle size of the 85 weight percentile of the fines in the finer fraction, and
    (e) positioning said particulate pack in said wellbore to rest against said formation whereby the flow of fluid from said formation passes through said pack.

4. A method for controlling the movement of solid particles from a subterranean formation in response to fluid flowing from the formation into a wellbore therein, comprising the steps of:
    (a) determining the particle size distribution of the particles in each strata of which the formation is comprised and in which each strata suffers movement of solid particles in response to fluid flowing therethrough,
    (b) correlating the particles sizes of said particles in each said strat with the weight percentile thereof for establishing the particle size of the 85 weight percentile of the fines in the distribution of said particles in each said strata,
    (c) selecting the smallest of the particle sizes of the 85 weight percentile of the fines in the distribution of said particles in said strata,
    (d) providing particles to form a particulate pack and said particles having a particle size distribution wherein the particle size of the 15 weight percentile of the fines in the distribution of said particles is less than four times the smallest of the particle sizes of the 85 weight percentile of the fines in the distribution of said particles in each said strata in which fluid flow moves solid particles therefrom, (e) combining said particles which form said particulate pack so that the particle size distribution thereof provides in all divisions of said pack into coarser and finer fractions about any particle size the particle size of the 15 weight percentile of the fines in the coarser fraction is less than four times the particle size of the 85 weight percentile of the fines in the finer fraction, and (f) positioning said particulate pack in said wellbore to rest against said formation whereby the flow of fluid from said strata of said formation passes through said pack.

5. A method for controlling the movement of solid particles from a subterranean formation in response to fluid flowing from the formation into a wellbore therein, comprising the steps of:

(a) determining the particle size distribution of the particles in each strata of which the formation is comprised and in which each strata suffers movement of solid particles in response to fluid flowing therethrough, (b) correlating the particle sizes of said particles in each said strata with the weight percentile thereof for establishing the particle size of the 85 weight percentile of the fines in the distribution of said particles in each said strata, (c) providing particles to form a particulate pack to reside adjacent each staid strata, and said particles of each said pack having a particle size distribution wherein the particle size of the 15 weight percentile of the fines in the distribution of said particles is less than four times the 85 weight percentile of the fines in the distribution of said particles in said strata against which each respective pack is placed, and (d) selecting said particles which form each said particulate pack so that the particle size distribution thereof provides in all divisions of each said pack into coarser and finer fractions about any particle size that the particle size of the 15 weight percentile of the fines in the coarser fraction is less than four times the particle size of the 85 weight percentile of the fines in the finer fraction, and (e) positioning each said particulate pack in said wellbore to rest against each said respective strata of said formation whereby the flow of fluid from said formation passes through said packs.

References Cited

UNITED STATES PATENTS

| | | | |
|---|---|---|---|
| 998,813 | 7/1911 | Todt | 61—30 |
| 2,905,245 | 9/1959 | De Priester | 166—20 X |

OTHER REFERENCES

Gumperzt, Ben., Screening Effect of Gravel on Unconsolidated Sands, in Petroleum Technology, 3(2), May 1940, TP. 1195.

Uren, Lester C., Petroleum Production Engineering-Oil Field Development, McGraw-Hill, New York, 4th ed., 1956, pp. 718 and 719.

CHARLES E. O'CONNELL, *Primary Examiner.*

IAN A. CALVERT, *Assistant Examiner.*

U.S. Cl. X.R.

61—30; 166—278; 210—290

UNITED STATES PATENT OFFICE
CERTIFICATE OF CORRECTION

Patent No. 3,434,540                                                        March 25, 1969

Nathan Stein

It is certified that error appears in the above identified patent and that said Letters Patent are hereby corrected as shown below:

Column 2, line 7, "causde" should read -- caused --. Column 5, line 19, "detremine" should read -- determine --; line 26, "certainely" should read -- certainly --. Column 7, line 48, "undistributed" should read -- undisturbed -- Column 8, line 18, "from" should read -- for --; line 44, "mathmetically" should read -- mathematically --. Column 9, line 72, "the" should read -- these --. Column 10, line 71, "percent" should read -- percentile --. Column 11, line 25, "agaisnt" should read -- against --; line 29, "1 m." should read -- 1 mm. --; line 34, "No." should read -- No --. Column 12, line 65, "strat" should read -- strata --. Column 13, line 9, before "the", first occurrence, insert -- that --.

Signed and sealed this 7th day of April 1970.

(SEAL)
Attest:

Edward M. Fletcher, Jr.                          WILLIAM E. SCHUYLER, JR.
Attesting Officer                                        Commissioner of Patents